United States Patent [19]

Cusack

[11] Patent Number: 4,756,648
[45] Date of Patent: Jul. 12, 1988

[54] ROTATABLY ADJUSTABLE BORING BAR

[75] Inventor: Robert F. Cusack, Grosse Pointe Park, Mich.

[73] Assignee: GTE Valeron Corporation, Troy, Mich.

[21] Appl. No.: 117,893

[22] Filed: Nov. 2, 1987

Related U.S. Application Data

[63] Continuation of Ser. No. 814,941, Dec. 30, 1985, abandoned.

[51] Int. Cl.[4] .............................................. B23B 29/02
[52] U.S. Cl. .................................... 408/156; 408/150; 408/180
[58] Field of Search ............... 408/146, 147, 150, 151, 408/153, 154, 156, 158, 159, 160, 162, 168, 170, 173, 178, 179, 180, 714

[56] References Cited

U.S. PATENT DOCUMENTS

| | | | |
|---|---|---|---|
| 3,261,236 | 7/1966 | Flannery | 408/156 X |
| 3,379,077 | 4/1968 | Gustafson | 408/156 |
| 3,667,856 | 6/1972 | Walker | 408/146 X |
| 3,749,508 | 7/1973 | Schukrafft | 408/156 X |
| 3,961,857 | 6/1976 | Koblesky | 408/150 X |
| 4,351,207 | 9/1982 | Werth, Jr. | 408/156 X |
| 4,594,033 | 6/1986 | Peetz et al. | 408/156 |

Primary Examiner—Z. R. Bilinsky
Attorney, Agent, or Firm—Robert E. Walter

[57] ABSTRACT

An adjustable boring bar wherein the adjustment of the cutting end is provided by a prestressed internal bar bearing against the cutting end to selectively distort the boring bar in the direction of the cutting bit to compensate for wear. The adjustment is by means of rotation of the prestressed internal bar to direct the pressure of the internal bar against the boring bar and cutting bit in the desired direction.

5 Claims, 1 Drawing Sheet

ROTATABLY ADJUSTABLE BORING BAR

Continuation of Ser. No. 814,941 filed Dec. 30, 1985, now abandoned.

CROSS-REFERENCE TO RELATED APPLICATIONS

Patent applications: Ser. No. 814,939, now abandoned, entitled "Adjustable Boring Bar" Ser. No. 814,940, now abandoned, entitled "Fixed Beam Adjustable Boring Bar" and Ser. No. 814,468, now abandoned, entitled "Excentric Beam Mounting" each in the name of Robert F. Cusack are filed concurrently herewith on related subject matter and assigned to the same assignee as the present invention.

FIELD OF THE INVENTION

This invention generally relates to machine tools and more particularly to a new and improved adjustable boring bar for use during a machining operation.

BACKGROUND OF THE INVENTION

Within the field of machining and more specifically precision boring of holes there is a need for a reliable, rigid, simple, and micro adjustable boring bar. There are numerous examples of attempts to provide precision adjustment but most are complex and inherently weaken the fundamental rigidity of the tool to accommodate their means of adjustment, such as gears and complex bearings. There are also examples of units that provide an adjustable bore size but lack the fine adjustment required to compensate for tool wear. This fine adjustment capability is increasingly important in today's ultra precise machining requirements.

SUMMARY OF THE INVENTION

This invention addresses these requirements in a most efficient manner. It basically includes the usual provision for attachment to a machine appropriately bored out, forming a thick walled, closed end tube. This tube maybe either machined as one piece with the adapter or be attached to a separate adapter. The closed end of the tube includes a provision for attaching a suitable cutting device (i.e. indexible tungsten carbide insert). This provision may consist of utilizing existing sizing heads such as are commercially available. When used, these tools would have the appropriate standard means of attachment to the nose of the boring bar. Adjustment of the closed end of the boring bar including the cutting tool is provided by the combination of a prestressed bar within the bore of the closed end tube and an arrangement for rotating the bar to direct the force of the stressed bar in the proper direction to advance to the nose of the bar.

The lateral force is preferably provided in discrete or measurable increments by only incrementally rotating the bar. The flexible bar is supported at each end within the tube. The supports are to position the bar in the axial center of the bar.

BRIEF DESCRIPTION OF THE DRAWINGS

The object and features of this invention and the manner of obtaining them will become more apparent, and the invention itself will be better understood by reference to the following description of an embodiment of the invention taken in conjunction with the accompanying drawings in which.

DESCRIPTION OF THE PREFERRED EMBODIMENT

Figure 1:
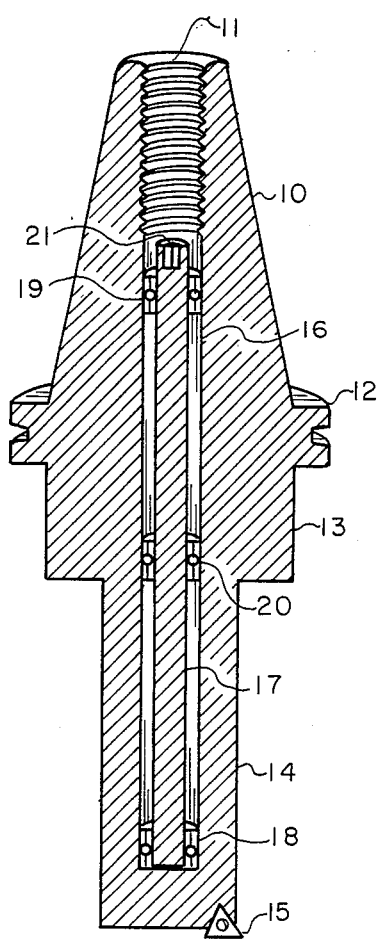
FIG. 1 shows a sectional perspective view of a first embodiment of the invention.

Referring to FIG. 1 there is shown a toolholder of generally cylindrical form having a shank or adapter portion 10 which is adapted to be mounted in the shank receiving socket of a powered conventional spindle. The shank of the adapter is tapered and includes a threaded bore 11 therein for receiving a mator driven screw (not shown). The adapter further includes a flange portion 12 with an annular ring for engaging drive keys (not shown). Extending from the neck 13 is the tool bit 15 holding bar 14. The cutting bit 15 is adapted to be seated in a pocket in the tool end and retained therein by conventional means.

The bore 16 extends beyond the threaded portion 11 through the shank portion 10 into the tool bit holding bar 14. Within this bore 16 is located a steel bar 17 of a diameter smaller than the diameter of the bore 16. This bender bar 17 is bowed during manufacture to exert the desired reactive force at its terminal ends upon attempts to return it to a straight form. A set of bearings 18, 19 and 20 located at the bit end of the bar, the adapter end and the approximate center of the bar respectively. The bearings 18, 19 and 20 serve to locate the axis of the bar 17 along the axis of the toolholder bar.

Figure 4:
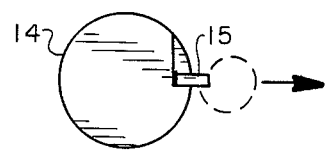
FIG. 4 shows the path taken by the cutting bit as the prestressed bar is rotated.

With the prestressed bar 17 thus positioned within the bore 16 of the boring bar, the tool bit holding end 14 carving the bit 15 is twisted or bent in the direction the force of the bend of the bar 17. The track of the obtainable positions of the end of the boring bar and its bit 15 is illustrated in FIG. 4. To facilitate rotation of the bar 17 a key hole 21 may be used. Thus a hex key (not shown) may be inserted from the adapter end in through the base 11 into the key way to rotate the bar to obtain the desired bit position.

Figure 2:
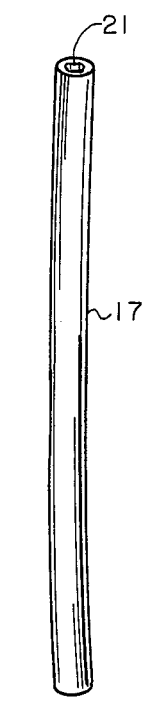
FIG. 2 shows a sectional perspective view of the prestressed bar.
Figure 3:
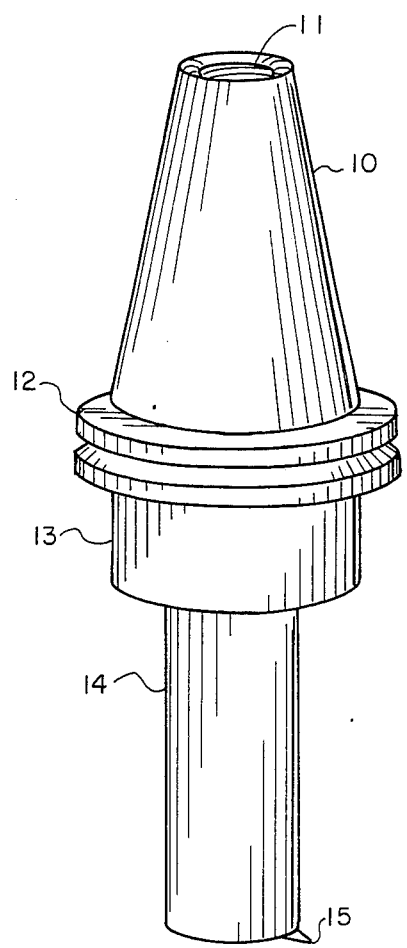
FIG. 3 is a perspective view of the exterior of the embodiment of FIG. 1. of the invention.
Figure 5:
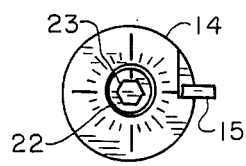
FIG. 5 shows a sectional perspective view of an alternate arrangement for the adjustment of the prestressed bar.

An alternate arrangement for facilitating the rotation of the bar 17 is shown in FIG. 5. In this figure is shown a passage 23 drilled into the tool bit holding end of the boring bar 14. The end of the prestressed bar 17 is then accessible through this drilled passage. This accessible end of the bar 17 is then provided with a key hole 22 similar to that shown in FIG. 2 whereby the bar may be rotated. Index marks may be provided as shown to facilitate repeatable positioning.

The basic principle of operation is as follows: The bender bar 17 as it is rotated axially translates approximately 50% of the available force to each of its end points, if the bearing 20 is centrally positioned on the bender bar. Other ratios may be used as may be required for appropriate applications. Example: a short or an extra long bar. Since the adapter 10 side is essentially rigid with respect to the boring bar 14 it provides a stable reference with respect to the machine tool. As the bender bar 17 is turned, the portion of its force at the end is applied to its point of contact via the bearing 18 within the boring bar 14. This force urges the boring bar in the direction of the force according to the standard principle, of beam loading and bending such as referenced in Marks Standard Handbook to Mechanical Engineers & Machineries Handbook.

The available force of the central bender bar being fixed results in a fixed distance the boring bar 14 is displaced from its true axial position. However, since the bar 17 may be rotated, the direction of bending of the entire boring bar assembly can be controlled. As shown on FIG. 4 this rotation can be translated into the desired distance of displacement of the tool tip. This rotation provides the means for the ultra fine resolution of adjustment of this system while providing a remarkable range of displacement.

As an example a bar has been constructed as per FIG. 1. The essential dimensions are as follows: This boring bar is essentially 8 inches long with the section including the neck 13 back being of approximately a 2 inch diameter by 4 inches long with section 14 being of 1 inch diameter and 4 inches long. The entire bar is bored to a 0.625 in diameter about its entire length. It is assumed for simplicity that the 2 inch diameter section is relatively inflexible with respect to the 1 inch diameter section.

The boring bar is pretensioned to the maximum deflection for the boring bar with a safe stress limit of 120,000 psi.

The maximum deflection (F) for the boring bar with a safe stress (S) limit of 120,000 psi is:

$$F = \frac{2 \times L2 \times S}{3 \times h \times E} = .042 \text{ in from center line}$$

F=Deflection in inches
W=Force in pounds
S=Stress in pounds/square inch
L=Length
h=Height
E=Youngs modules (30,000,000 P.S.I. for steel)
I=Moment of inertia
D=Outside diameter
d=Inside diameter The moment of inertia of a one inch outside diameter 0.625 inside diameter bar equals:

I=0.049 (DR4-dR4)

I=0.049 (1^4−0.625^4)

I=0.04152

Keeping the stress to a very conservative 10% maximum the force required to deflect the bar 0.009" is $$W = \frac{F \times 3 \times E \times I}{L^3}$$

W = 536 lbs. for a .009 deflection $$F = \frac{W \times LR3}{3 \times E \times I} = \frac{536 \times 4^3}{3 \times 3 \times 10R7 \times .003} = .122 \text{ inches}$$

The central ½ inch diameter bar in this example can safely produce a 536 lb. force at each end with a displacement at its center of 0.122 inches. This means that for each 0.001 inch of displacement on the center of the bender bar the tool tip is urged $$\frac{.009}{(.122 \times .001)} = .000074 \text{ inches.}$$

Thus the central displacement required to produce a 0.000010 inch tool tip displacement is 10/74×0.001=0.000135 inches. This corresponds to an approx. 1.36 degree increment on a ¼-28 pitch adjusting screw. That is for each 1.36 degress of rotation on the adjusting screw the tool tip will advance 10 micro inches.

It can be appreciated by those trained in the art that the specific cross sections and internal geometry's must be dictated by the design requirements of each type of bar.

It should be understood that the foregoing description contains a specific example of various features of this invention which may be used individually if desired but when combined cooperate to provide an extremely easy and precisely adjustable boring bar construction. Various modifications of the specifically illustrated examples will become apparent those skilled in the art upon a study of the specification, drawings and the following claims.

What is claimed is:

1. An adjustable boring bar comprising: an elongated hollow first shaft member having an axis of rotation,
    a cutting bit interchangeably mounted on said elongated hollow first shaft member at a first end,
    said elongated hollow first shaft member having an interior opening at the end opposite said first end, said interior opening extending in a radial direction and along the axis of rotation,
    said hollow elongated first shaft member including an extension adapted to be coupled to a power means,
    a second shaft member being disposed in said interior opening,
    said second shaft member being pretensioned by bending to an arc,
    first, second, and third positioning means for rotatably holding said second shaft with respect to said elongated first hollow shaft member within said interior opening in a radially spaced relationship,
    said first and second positioning means being located at remote positions along the axis of rotation and said third positioning means being located at an intermediate position with respect to said first and second positioning means whereby said second shaft member is operable to bear against said elongated hollow first shaft member and bend said elongated hollow first shaft member to axially displace said cutting bit.

2. An adjustable boring bar as claimed in claim 1 further including adjusting means comprising a means to rotate said second shaft to change the direction of displacement of said hollow elongated first shaft member.

3. An adjustable boring bar as claimed in claim 2 wherein said means to rotate said second bar comprises an axial key hole in said second shaft.

4. An adjustable boring bar as claimed in claim 3 wherein said axial key hole is positioned in said second shaft at the end facing the end opposite said first end.

5. An adjustable boring bar as claimed in claim 3 wherein said axial key hole is positioned at the end facing said first end, and said first end includes an access passage to said key hole.

* * * * *